US012055444B2

(12) United States Patent
Borin

(10) Patent No.: US 12,055,444 B2
(45) Date of Patent: Aug. 6, 2024

(54) TEMPERATURE MONITORING DEVICE

(71) Applicant: Aptiv Technologies AG, Schaffhausen (CH)

(72) Inventor: Boris Borin, Willoughby Hills, OH (US)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 17/961,910

(22) Filed: Oct. 7, 2022

(65) Prior Publication Data

US 2023/0049141 A1  Feb. 16, 2023

Related U.S. Application Data

(63) Continuation of application No. 16/722,653, filed on Dec. 20, 2019, now Pat. No. 11,506,541.

(60) Provisional application No. 62/787,856, filed on Jan. 3, 2019.

(51) Int. Cl.
| H02H 9/08 | (2006.01) |
| G01K 1/02 | (2021.01) |
| G01K 1/024 | (2021.01) |
| G01K 7/22 | (2006.01) |
| G01K 13/00 | (2021.01) |

(Continued)

(52) U.S. Cl.
CPC ............ *G01K 1/026* (2013.01); *G01K 1/024* (2013.01); *G01K 7/22* (2013.01); *G01K 13/00* (2013.01); *H01R 13/665* (2013.01); *H01R 13/6666* (2013.01); *H01R 13/6683* (2013.01)

(58) Field of Classification Search
CPC ..... Y02T 90/14; Y02T 10/70; Y02T 10/7072; H04B 3/54
USPC .......................................................... 361/42
See application file for complete search history.

(56) References Cited

U.S. PATENT DOCUMENTS

| 9,365,124 | B2 * | 6/2016 | Soden ................... B60L 53/305 |
| 9,472,899 | B1 | 10/2016 | Reedy et al. |
| 9,493,083 | B1 | 11/2016 | Sumner et al. |
| 9,564,719 | B1 | 2/2017 | Oldham et al. |
| 9,634,435 | B1 * | 4/2017 | Raschilla ................ B60L 53/16 |

(Continued)

FOREIGN PATENT DOCUMENTS

| CN | 2122441 U | 11/1992 |
| CN | 101682200 A | 3/2010 |

(Continued)

OTHER PUBLICATIONS

First Chinese Office Action for Chinese Application No. 202010005898. 7, dated Feb. 1, 2021, 10 pages.

(Continued)

*Primary Examiner* — Jared Fureman
*Assistant Examiner* — Lucy M Thomas
(74) *Attorney, Agent, or Firm* — Billion & Armitage

(57) ABSTRACT

An electric vehicle supply equipment device includes a removable grid cord having an electrical plug and a device housed within the electrical plug. The device has a plurality of temperature sensing elements, a control module, and an electrical circuit electrically coupling the plurality of temperature sensing elements and the control module, the electrical circuit having an electrical power carrying conductor. The device further includes an in-cable control protection device. The control module communicates an indication of a temperature condition of the electrical plug to the in-cable control protection device via the electrical power carrying conductor.

6 Claims, 6 Drawing Sheets

(51) Int. Cl.
*H01R 13/66* (2006.01)
*H02H 3/00* (2006.01)

(56) References Cited

U.S. PATENT DOCUMENTS

| | | | |
|---|---|---|---|
| 9,768,554 B2 | 9/2017 | Raschilla et al. | |
| 2010/0108863 A1* | 5/2010 | Yang | H05B 47/11 |
| | | | 250/214 AL |
| 2016/0031335 A1 | 2/2016 | Soden et al. | |
| 2016/0039297 A1 | 2/2016 | Kretschmer et al. | |
| 2016/0082852 A1* | 3/2016 | Kim | G01K 7/16 |
| | | | 439/620.21 |
| 2016/0195435 A1 | 7/2016 | Krueger et al. | |
| 2016/0288658 A1 | 10/2016 | Rudolph et al. | |
| 2016/0377532 A1* | 12/2016 | Dainobu | G01N 33/497 |
| | | | 250/339.12 |
| 2017/0077656 A1 | 3/2017 | Beideman et al. | |
| 2017/0093148 A1 | 3/2017 | Wang et al. | |
| 2018/0361862 A1* | 12/2018 | Hein | B60L 53/66 |
| 2020/0317069 A1* | 10/2020 | Akai | H01M 10/46 |

FOREIGN PATENT DOCUMENTS

| | | | |
|---|---|---|---|
| CN | 105375206 | A | 3/2016 |
| CN | 105449736 | A | 3/2016 |
| CN | 105675156 | A | 6/2016 |
| CN | 106058593 | A | 10/2016 |
| CN | 109103667 | A | 12/2018 |
| CN | 109449687 | A | 3/2019 |
| EP | 2628630 | A2 | 8/2013 |
| GB | 1 600 056 | * | 10/1981 |
| GB | 1600056 | A | 10/1981 |
| WO | 2008113049 | A1 | 9/2008 |
| WO | 2016081909 | A1 | 5/2016 |

OTHER PUBLICATIONS

"Extended European Search Report for European Application No. 22179127.0 dated Oct. 5, 2022", 10 Pages.
"Extended European Search Report for Application No. 23207664.6"; European Patent Office; dated Jan. 26, 2024; 9 Pages.

* cited by examiner

FIG. 6

| Data packet sent from grid cord to the IC-CPD | | | | | | |
|---|---|---|---|---|---|---|
| Byte 0 | Byte 1 | Byte 2 | Byte 3 | Byte 4 | Byte 5 | Byte 6 |
| Grid Cord ID | Temp@Location 1 | Temp@Location 2 | Temp@Location 3 | Temp@Location 4 | CRC16MSB | CRC16LSB |

Above shows one embodiment using a fixed data packet sent at regular time intervals, for example every 1 second. Byte 0 contains unique ID that identifies the grid cord type using, for example, a look up table below. Byte 1 thru Byte 4 are 2's compliment representation of the temperature at location A thru location D with 1 degree Celsius resolution. Byte 5 thru byte 6 are the most significant and least significant byte of 16-bit CRC performed on byte 0 thru byte 4, MSb or LBs first, using $g(X) = x^{16} + x^{12} + x^5 + 1$, or any other generator polynomial.

Table of grid Cord IDs

| ID value (HEX) | Grid Cord Type |
|---|---|
| 0x00 | Reserved |
| 0x01 | NEMA 5-15 |
| 0x02 | NEMA 5-20 |
| 0x03 | JIS C 8303 |
| 0x04 | CEE 7/16 |
| 0x05 | CEE 7/17 |
| 0x06 | GOST 7396 C 1 |
| 0x07 | CEE 7/6 |
| 0x08 | CEE 7/4 |
| 0x09 | CEE 7/7 |
| 0x0A | SI 32 |
| 0x0B | AS/NZS 3112 |
| 0x0C | GB 1002 |
| 0x0D | IRAM 2073 |
| 0x0E | SEV 1011:2009 |
| 0x0F | 107-2-D1 |
| 0x10 | CEI 23-50 |
| 0x11 | BS 546 |
| 0x12 | IS 1293 |
| 0x13 | SANS 164-1 |
| 0x14 | NBR 14136 2-pin |
| 0x15 | NBR 14136 3-pin |
| 0x16 | SANS 164-2 2-pin |
| 0x17 | SANS 164-2 3-pin |
| 0x18 | TIS 166-2549 |
| 0x19 thru 0xFF | Reserved |

| Data packet sent from grid cord to the iC-CPD | | |
|---|---|---|
| Byte 0 | Byte 1 | Byte 2 |
| Data MSB | Data LSB | Checksum |

| Data packet sent from iC-CPD to the grid cord | |
|---|---|
| Byte 0 | Byte 1 |
| 0x00 | Data Request |

Above shows one embodiment using a data request packet to specify what data is requested from the iC-CPD (see data request table). The grid cord responds back with a packet containing the requested data and the checksum of byte 0 thru byte 1. In this embodiment, the master (iC-CPD) sends the request for desired data to the slave (grid cord). After the master sends the request, it sets the bus to high impedance. The slave, after receiving the packet waits a designated time before responding. This wait time is given to be sufficient to allow the master to switch the bus to high impedance. The master waits a reasonable time for the slave to respond. If there is no response from the slave the master will repeat the request.

| Table of grid Cord IDs | |
|---|---|
| ID value (HEX) | Data Request |
| 0x01 | Reserved |
| 0x18 | Temp @ Location 1 |
| 0x2F | Temp @ Location 2 |
| 0x36 | Temp @ Location 3 |
| 0x4D | Temp @ Location 4 |
| 0x54 | Highest Temp of 1..4 |
| 0x6B | Highest Temp of 1,4 |
| 0x72 | Highest Temp of 2,3 |
| 0x89 | Delta Temp 1..4 |
| 0x90 | Delta Temp 1,4 |
| 0xA7 | Delta Temp 2,3 |
| 0xBE | Reserved |
| 0xC5 | Reserved |
| 0xDC | Reserved |
| 0xE3 | Reserved |
| 0xFA | Grid Cord ID *See table of Grid Cord IDs (Embodiment 1) |
| All other values | Buss Error |

FIG. 7

TEMPERATURE MONITORING DEVICE

CROSS-REFERENCE TO RELATED APPLICATION

This application is a continuation of U.S. patent application Ser. No. 16/722,653 filed on Dec. 20, 2019, which claimed the benefit of U.S. Provisional Patent Application No. 62/787,856 filed on Jan. 3, 2019, the entire disclosure of each which is hereby incorporated by reference.

TECHNICAL FIELD OF THE INVENTION

This disclosure generally relates to a temperature monitoring device, and more particularly relates to a temperature monitoring device for a battery charging cable.

BRIEF SUMMARY OF THE INVENTION

According to one exemplary embodiment, an electric vehicle supply equipment device includes a removable grid cord having an electrical plug having one of various plug configurations. and a control module configured to communicate an indication of a classification of the electrical plug via an electrical power carrying conductor.

In another exemplary embodiment, an electric vehicle supply equipment device includes an in cable-control protection device and a removable grid cord having an electrical plug and a control module configured to communicate with the in cable-control protection device via an electrical power carrying conductor.

In another exemplary embodiment, an electric vehicle supply equipment device includes a plurality of temperature sensing elements each arranged proximally to a current carrying blade of an electrical plug and a control module that receives a plurality of temperature signals that each indicate a current carrying blade temperature associated with the electrical plug from the plurality of temperature sensing elements, determines a temperature condition of the electrical plug based on the plurality of temperature signals, and communicates an indication of the temperature condition of the electrical plug by disrupting electrical power carried by an electrical power carrying conductor.

In another exemplary embodiment, an electric vehicle supply equipment device includes a removable grid cord having an electrical plug and a device housed within the electrical plug. The device has a plurality of temperature sensing elements, a control module, and an electrical circuit electrically coupling the plurality of temperature sensing elements and the control module, the electrical circuit having an electrical power carrying conductor. The electric vehicle supply equipment device further includes an in cable-control protection device. The control module is configured to communicate an indication of a temperature condition of the electrical plug to the in cable-control protection device via the electrical power carrying conductor.

BRIEF DESCRIPTION OF THE SEVERAL VIEWS OF THE DRAWING

The present invention will now be described, by way of example with reference to the accompanying drawings, in which:

FIG. 6 is an example of a communication between a control module and the interface circuit in accordance with one embodiment; and FIG. 7 is an example of a communication between a control module and the interface circuit in accordance with one embodiment.

DETAILED DESCRIPTION OF THE INVENTION

Figure 1:
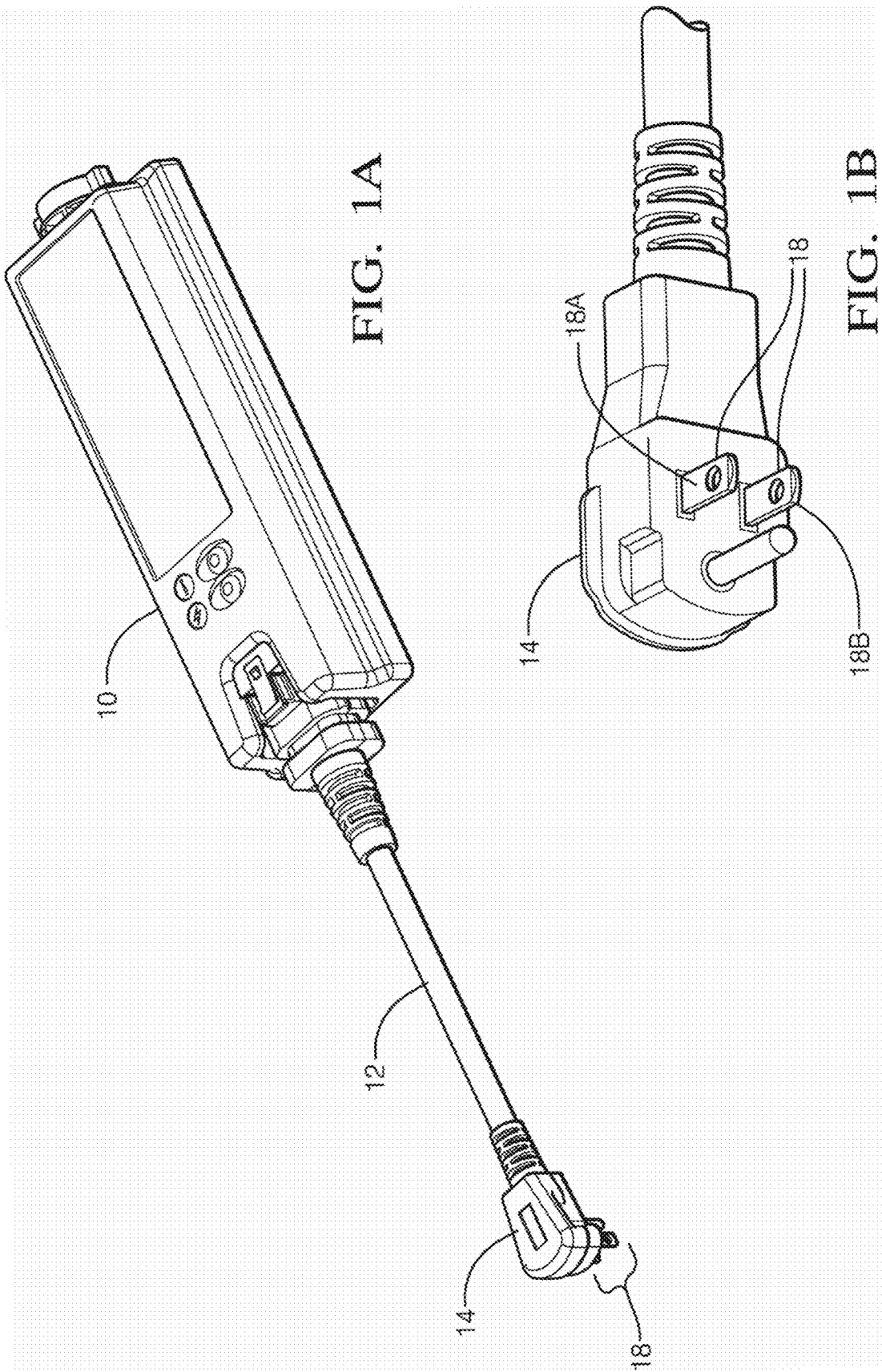
FIG. 1A is an illustration of an electric vehicle supply equipment with a removable grid cord in accordance with one embodiment.
FIG. 1B is an illustration of an electrical plug of the removable grid cord of FIG. 1A in accordance with one embodiment.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1A is an illustration of an electric vehicle supply equipment 10 (EVSE 10) with a removable grid cord 12 that is used to charge a battery of an electric vehicle (EV) and/or a battery of a hybrid EV. The removable grid cord 12 may have various electrical plug configurations based on a voltage (V) of a receptacle that delivers electrical power to the electrical plug 14. For example, the electrical plug 14 that is configured for a 120V alternating current (AC) receptacle has two flat current carrying blades 18 and a cylindrical ground conductor. This particular configuration is classified as a NEMA 5-15 electrical plug 14 according to a National Electrical Manufacturers Association (NEMA) standard and is illustrated in FIG. 1B. Other classifications of electrical plugs 14 exist for other voltages, such a 240V AC (e.g., NEMA 6-20), that have different configurations of the current carrying blades 18.

The EVSE 10 is configured to recognize the classification of the electrical plug 14 of the removable grid cord 12 so that the charging of the EV battery may be controlled through a wire cable extending from the EVSE 10 (not shown). For example, when the EVSE 10 recognizes the NEMA 5-15 electrical plug 14, the EVSE 10 delivers 120V AC electrical power to the EV battery and will ensure the maximum allowable current drawn does not exceed the maximum allowed for the electrical plug 14. The EVSE 10 may also enable features such as ground fault detection for electrical plug 14. When the EVSE 10 recognizes the NEMA 6-20 electrical plug 14, the EVSE 10 delivers 240V AC electrical power to the EV battery and will ensure the maximum allowable current drawn does not exceed the maximum allowed for the electrical plug 14. The EVSE 10 may also enable features such as ground fault detection for electrical plug 14. When the EVSE 10 recognizes the CEE7/2 electrical plug, the EVSE 10 delivers 240V AC electrical power to the EV battery and will ensure the maximum allowable current drawn does not exceed the maximum allowed for the electrical plug 14. The EVSE 10 may also disable features such as ground fault detection for this electrical plug 14. In addition, when the battery is fully charged, and/or the EVSE 10 determines that fault condition exists, the EVSE 10 is configured to stop the electrical power delivered to the battery.

Figure 2:
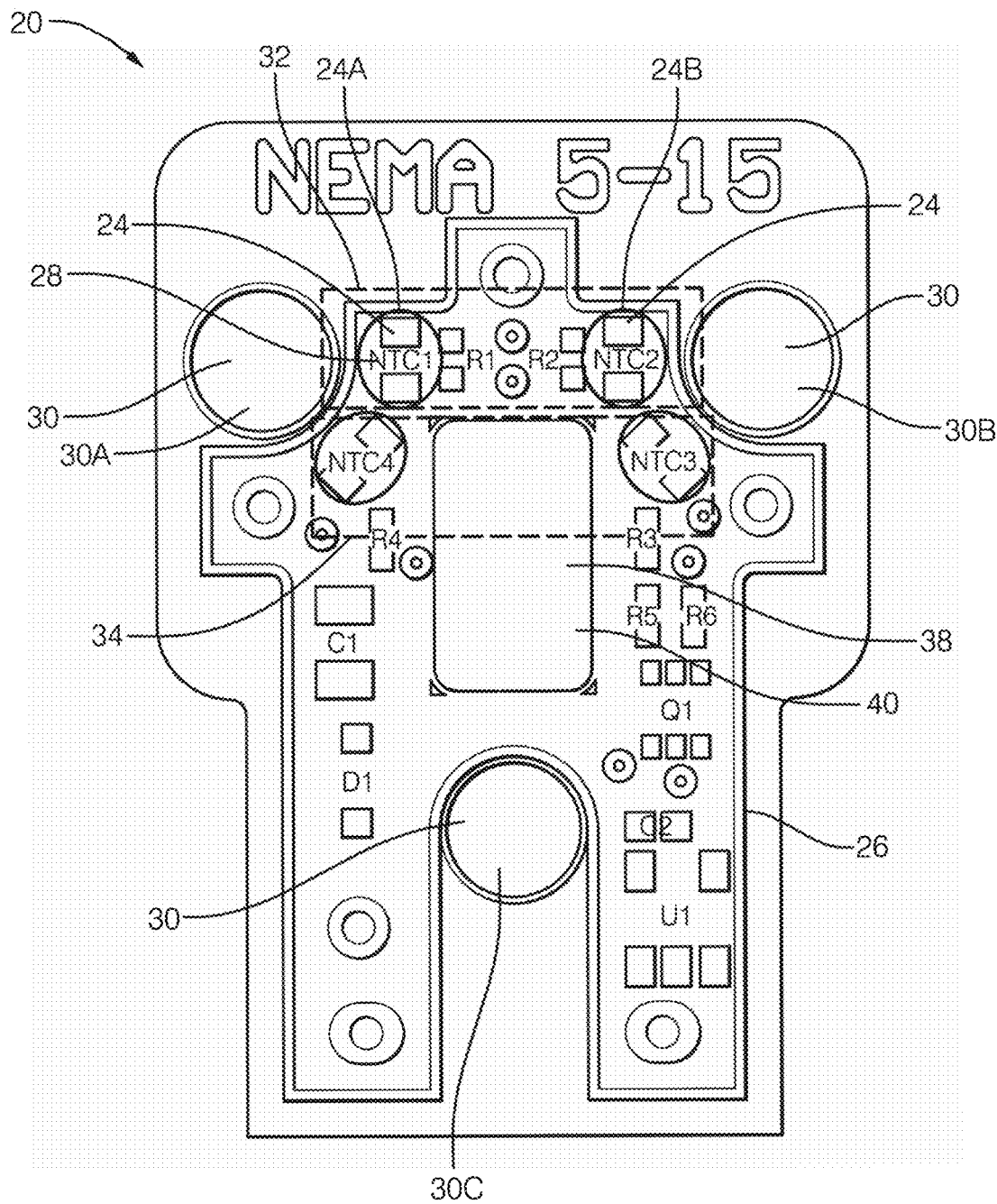
FIG. 2 is an illustration of a printed circuit board with temperature monitoring for the electrical plug of FIG. 1B in accordance with one embodiment.

FIG. 2 illustrates a device 20 configured to monitor a temperature condition of the electrical plug 14. In the example illustrated in FIG. 2, the device 20 is configured to be housed within the NEMA 5-15 electrical plug 14, and for purposes of illustration is isolated from the housing. It will be appreciated that the device 20 may be configured for any classification of the electrical plug 14. The temperature condition of the electrical plug 14 includes a condition selected from the group consisting of: a temperature of the electrical plug 14, the temperature associated with a respective current carrying blade 18, an ambient temperature surrounding the electrical plug 14, an overtemperature condition of the electrical plug 14, an overtemperature condition associated with a respective current carrying blade 18, and an identification of a respective current carrying blade 18.

The device 20 includes a plurality of temperature sensing elements 24 each arranged proximally to the respective current carrying blade 18 of the electrical plug 14. The plurality of temperature sensing elements 24 are mounted to a printed circuit board (PCB) 26 and are indicated by reference indictors NTC1, NTC2, NTC3, and NTC4. The plurality of temperature sensing elements 24 may be any temperature sensing elements 24, and in the example illustrated in FIG. 2 are thermistors 28 having a negative temperature coefficient of resistance.

The PCB 26 defines a plurality of apertures 30 each configured to receive one of the carrying blades 18 of the electrical plug 14. In the example illustrated in FIG. 2, the plurality of apertures 30 include a first aperture 30A for receiving a first current carrying blade 18A, a second aperture 30B for receiving a second current carrying blade 18B, and a third aperture 30C for receiving the ground conductor of the electrical plug 14.

The plurality of temperature sensing elements 24 are each arranged proximally to the respective current carrying blade 18A, 18B of the electrical plug 14 and include at least a first temperature sensing element 24A arranged proximally to the first aperture 30A, and at least a second temperature sensing element 24B arranged proximally to the second aperture 30B. The plurality of temperature sensing elements 24 also comprise a first plurality of temperature sensing elements 32 (e.g., NTC1 and NTC2), and a second plurality of temperature sensing elements 34 (e.g., NTC3 and NTC4), each arranged proximally to each respective current carrying blade 18 of the electrical plug 14.

Figure 3:
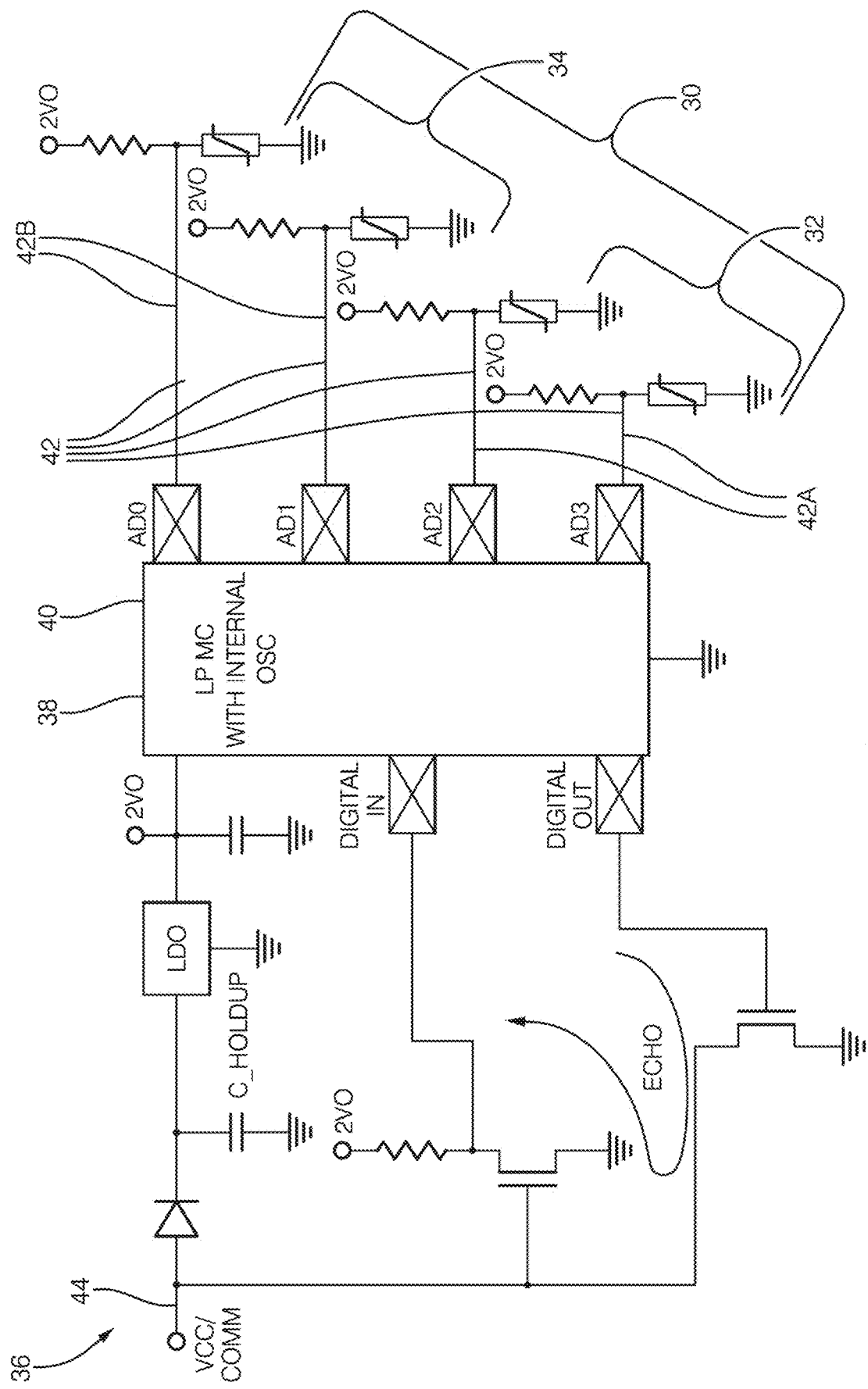
FIG. 3 is a schematic of an electrical circuit for monitoring a temperature of the removable grid cord of FIG. 1 in accordance with one embodiment.

FIG. 3 is an example of a schematic of an electrical circuit 36 of the device 20. The device 20 also includes a control module 38 configured to monitor the plurality of temperature sensing elements 24. The control module 38 may be any control module 38 capable of performing the tasks described herein, and in the example illustrated in FIG. 3, the control module 38 is a microprocessor 40. The control module 38 is disposed within the housing of the electrical plug 14 and is mounted on the PCB 26 distal from the plurality of temperature sensing elements 24. Referring back to FIG. 2, the plurality of temperature sensing elements 24 are arranged non-integrally to the control module 38. That is, the plurality of temperature sensing elements 24 are not contained within the package of the control module 38. This has the technical benefit of improving a response time of the device 20 by enabling the plurality of temperature sensing elements 24 to be located closer to the current carrying blades 18 than would otherwise be possible.

The control module 38 is configured to receive a plurality of temperature signals 42 from the plurality of temperature sensing elements 24. The plurality of temperature signals 42 each indicate a temperature associated with the respective current carrying blades 18 of the electrical plug 14. The control module 38 determines the temperature condition of the electrical plug 14 based on the plurality of temperature signals 42 and communicates an indication of the temperature condition to the EVSE 10. The control module 38 communicates the indication of the temperature condition of the electrical plug 14 via an electrical power carrying conductor 44 that supplies the electrical power via the electrical plug 14.

The control module 38 is configured to receive from the second plurality of temperature sensing elements 34, a second plurality of temperature signals 42B that each indicate the temperature associated with the respective current carrying blades 18 of the electrical plug 14. The control module 38 is further configured to determine, based on a first plurality of temperature signals 42A and the second plurality of temperature signals 42B, the temperature condition of the electrical plug 14.

The control module 38 is further configured to communicate, via the electrical power carrying conductor 44 that supplies the electrical power via the electrical plug 14, an indication of a classification of the electrical plug 14. The indication includes a classification according to the National Electrical Manufacturers Association (NEMA) standard, as well as non-NEMA classified electrical plugs 14 (see FIG. 6) and is stored in a memory (not shown) of the control module 38.

Figure 4:
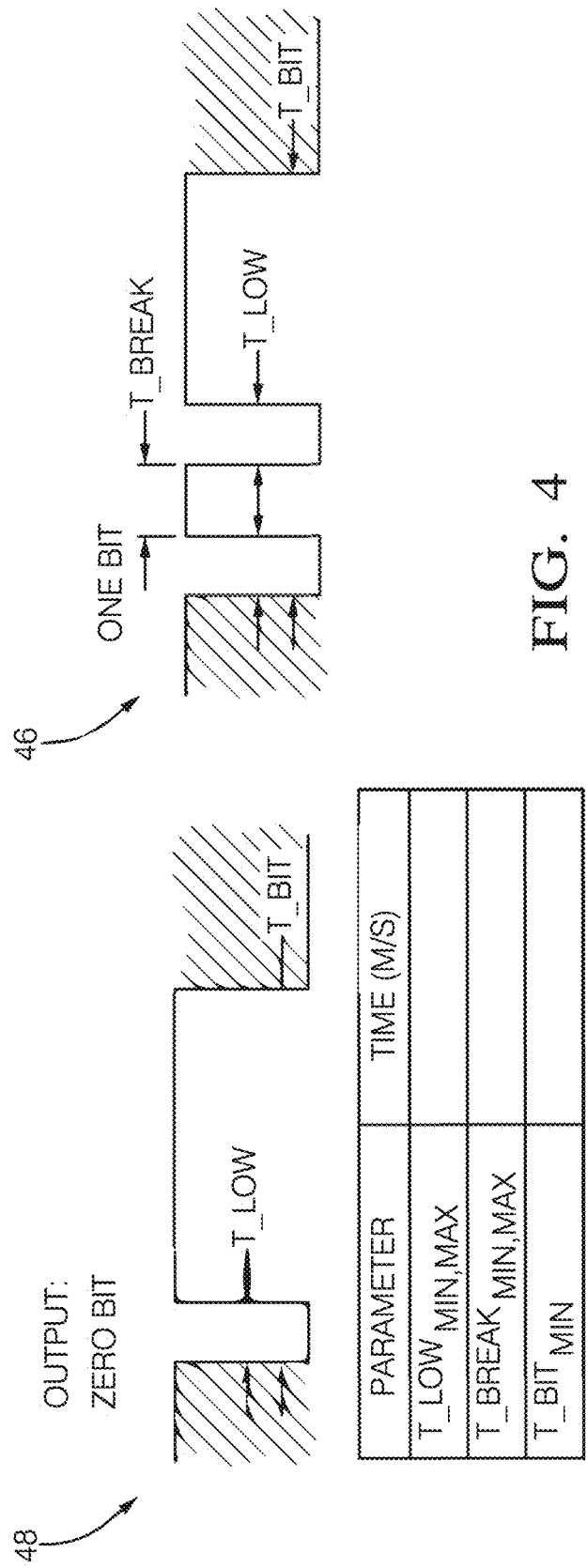
FIG. 4 is a communication protocol for the interface circuit of FIG. 4 in accordance with one embodiment.

FIG. 4 illustrates a communication protocol for the device 20. The control module 38 communicates, via the electrical power carrying conductor 44 that supplies the electrical power via the electrical plug 14, based on disrupting the electrical power carried by the electrical power carrying conductor 44.

The control module 38 communicates, via disrupting the electrical power according to a predetermined pattern, wherein a first pattern 46 indicates a logic 1 value, and a second pattern 48 indicates a logic 0 value. The control module 38 communicates the logic value 1 by disrupting the electrical power with a plurality of pulses, and wherein the control module 38 communicates the logic value 0 by disrupting the electrical power with a single pulse as shown in FIG. 4.

Figure 5:
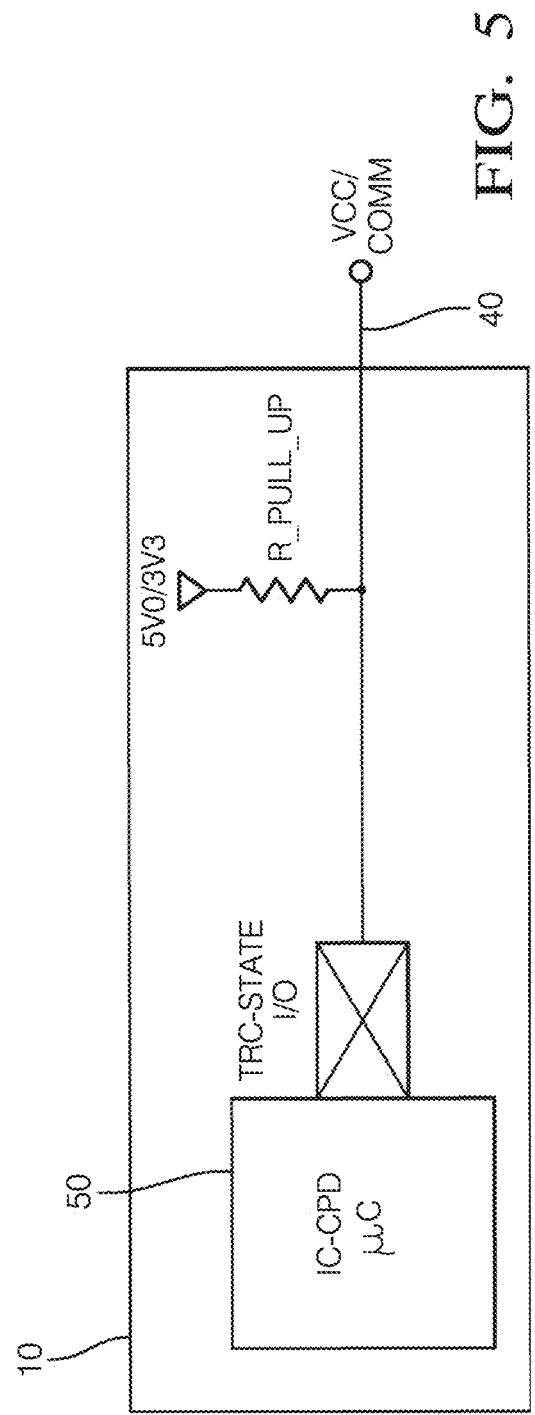
FIG. 5 is a schematic of an interface circuit for the electric vehicle supply equipment of FIG. 1 in accordance with one embodiment.

FIG. 5 illustrates an example of an interface circuit for the EVSE 10 of FIG. 1. The control module 38 communicates, via the electrical power carrying conductor 44, with an in cable-control protection device (IC-CPD) 50.

FIGS. 6 and 7 are examples of the communication between the control module 38 and the IC-CPD 50.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc., are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

I claim:

1. An electric vehicle supply equipment device, comprising:
   a first removable grid cord having an electrical plug with a first plug configuration conforming to National Electrical Manufacturers Association (NEMA) standard 5-15 configured for a 120 V receptacle or a second removable grid cord having an electrical plug with a second plug configuration conforming to NEMA standard 6-20 configured for a 240 V receptacle; and
   a control module comprising a microprocessor and disposed within the electrical plug, wherein the control module is configured to digitally communicate an indication of the first or second plug configuration by disrupting electrical power carried by an electrical power carrying conductor, wherein a first disruption pattern indicates a logic 1 value, and a second disruption pattern indicates a logic 0 value.

2. The electric vehicle supply equipment device of claim 1, wherein the control module communicates the logic 0 value by disrupting the electrical power with a single pulse and wherein the control module communicates the logic 1 value by disrupting the electrical power with a plurality of pulses.

3. The electric vehicle supply equipment device of claim 1, further comprising an in cable-control protection device, wherein the control module communicates the indication of the plug configuration to the in cable-control protection device.

4. An electric vehicle supply equipment device, comprising:
   an in cable-control protection device;
   a first removable grid cord having an electrical plug with a first plug configuration conforming to National Electrical Manufacturers Association (NEMA) standard 5-15 configured for a 120 V receptacle or a second removable grid cord having an electrical plug with a second plug configuration conforming to NEMA standard 6-20 configured for a 240 V receptacle; and
   a control module comprising a microprocessor and disposed within the electrical plug, wherein the control module is configured to digitally communicate an indication of the first or second plug configuration by disrupting electrical power carried by an electrical power carrying conductor, wherein a first disruption pattern indicates a logic 1 value, and a second disruption pattern indicates a logic 0 value.

5. The electric vehicle supply equipment device of claim 4, wherein the control module communicates the logic 0 value by disrupting the electrical power with a single pulse, and wherein the control module communicates the logic 1 value by disrupting the electrical power with a plurality of pulses.

6. An electric vehicle supply equipment device, comprising:
   a first removable grid cord having an electrical plug with a first plug configuration conforming to National Electrical Manufacturers Association (NEMA) standard 5-15 configured for a 120 V receptacle;
   a second removable grid cord having an electrical plug with a second plug configuration conforming to NEMA standard 6-20 configured for a 240 V receptacle; and
   a control module comprising a microprocessor and disposed within the electrical plug, wherein the control module is configured to digitally communicate an indication of the first or second plug configuration by disrupting electrical power carried by an electrical power carrying conductor, wherein a first disruption pattern indicates a logic 1 value, and a second disruption pattern indicates a logic 0 value.

* * * * *